(12) United States Patent
Samonigg et al.

(10) Patent No.: US 11,653,786 B2
(45) Date of Patent: May 23, 2023

(54) TABLE-TOP COOKING DEVICE

(71) Applicant: KONINKLIJKE PHILIPS N.V., Eindhoven (NL)

(72) Inventors: Gert Samonigg, Klagenfurt (AT); Marta Matusin, Graz (AT); Christian Schmoeller, Graz (AT); Franciscus Jozef Marie Starmans, Ebenthal (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 763 days.

(21) Appl. No.: 16/462,748

(22) PCT Filed: Nov. 22, 2017

(86) PCT No.: PCT/EP2017/080004
§ 371 (c)(1),
(2) Date: May 21, 2019

(87) PCT Pub. No.: WO2018/095949
PCT Pub. Date: May 31, 2018

(65) Prior Publication Data
US 2019/0374059 A1    Dec. 12, 2019

(30) Foreign Application Priority Data
Nov. 23, 2016 (EP) .................................. 16200267

(51) Int. Cl.
*A47J 27/05* (2006.01)
*A47J 27/00* (2006.01)
*A47J 37/06* (2006.01)

(52) U.S. Cl.
CPC ............ *A47J 27/05* (2013.01); *A47J 27/004* (2013.01); *A47J 37/06* (2013.01)

(58) Field of Classification Search
CPC .......... A47J 27/004; A47J 27/05; A47J 37/06
USPC ......... 99/467, 331, 327, 330, 339, 340, 352, 99/400, 427, 446, 450, 476; 219/400.401, 219/509; 126/20, 20.2, 369, 369.1, 126/369.3; 426/391, 144, 745, 445, 465, 426/496, 515, 523, 524; 29/412, 415,
(Continued)

(56) References Cited

U.S. PATENT DOCUMENTS

| 785,764 A | 3/1905 | Robinson | |
|---|---|---|---|
| 2,138,706 A | * 11/1938 | Myers | A47J 37/015 219/398 |

(Continued)

FOREIGN PATENT DOCUMENTS

| CN | 1094268 A | 11/1994 |
|---|---|---|
| CN | 2873036 Y | 2/2007 |

(Continued)

*Primary Examiner* — Tu B Hoang
*Assistant Examiner* — Vy T Nguyen
(74) *Attorney, Agent, or Firm* — Maschoff Brennan

(57) ABSTRACT

A table-top kitchen device, comprising a first food preparation chamber and at least a second food preparation chamber. The first and second food preparation chamber are operable simultaneously to prepare food that in use is received therein. The first and second food preparation chamber are physically separated from each other in such way that each chamber includes an autonomous cooking environment, wherein the cooking conditions, that is, a cooking method and/or at least one cooking parameter can differ per food preparation chamber.

17 Claims, 3 Drawing Sheets

(58) Field of Classification Search
USPC .......... 29/416, 433, 434; 206/508, 503, 501; 220/780, 794, 212
See application file for complete search history.

(56) References Cited

U.S. PATENT DOCUMENTS

| | | | | |
|---|---|---|---|---|
| 5,586,656 | A * | 12/1996 | Abrums | B65D 21/0219 |
| | | | | 206/501 |
| 5,974,953 | A * | 11/1999 | Messerli | A47J 27/05 |
| | | | | 126/369 |
| 6,875,959 | B1 | 4/2005 | Ciejek | |
| 8,739,380 | B1 * | 6/2014 | Montgomery | A47J 37/0704 |
| | | | | 29/415 |
| 9,227,165 | B1 * | 1/2016 | Gedeon-Janvier | |
| | | | | B01F 7/00583 |
| 9,676,539 | B2 * | 6/2017 | Sloat | A23L 5/15 |
| 10,010,216 | B2 * | 7/2018 | Garman | A47J 37/0611 |
| 2007/0068918 | A1 * | 3/2007 | Adamczak | A47J 27/16 |
| | | | | 219/401 |
| 2010/0288749 | A1 | 11/2010 | Wu | |
| 2012/0247342 | A1 * | 10/2012 | Van Der Vlis | A47J 27/05 |
| | | | | 99/330 |
| 2015/0053095 | A1 * | 2/2015 | Lin | A47J 27/05 |
| | | | | 99/403 |
| 2015/0157161 | A1 | 6/2015 | Lagerlof | |
| 2015/0182074 | A1 * | 7/2015 | Bucher | A47J 37/0786 |
| | | | | 99/445 |
| 2017/0245683 | A1 * | 8/2017 | Chen | A21B 3/04 |

FOREIGN PATENT DOCUMENTS

| | | |
|---|---|---|
| CN | 200957009 Y | 10/2007 |
| CN | 201127503 Y | 10/2008 |
| CN | 201153856 Y | 11/2008 |
| CN | 201452836 U | 5/2010 |
| CN | 102406438 A | 4/2012 |
| CN | 202397255 U | 8/2012 |
| CN | 103932581 A | 7/2014 |
| CN | 104367205 A | 2/2015 |
| CN | 104398142 A | 3/2015 |
| CN | 204245920 U | 4/2015 |
| CN | 204427799 U | 7/2015 |
| CN | 204445356 U | 7/2015 |
| CN | 104918526 A | 9/2015 |
| CN | 105476460 A | 4/2016 |
| CN | 105520622 A | 4/2016 |
| CN | 105662114 A | 6/2016 |
| DE | 9213607 U1 | 12/1992 |
| DE | 102009007844 A1 | 8/2010 |
| EP | 2338390 A1 | 6/2011 |
| EP | 2883482 A1 | 6/2015 |
| GB | 388968 A | 3/1933 |
| KR | 20110061064 A | 6/2011 |
| WO | 9904202 A2 | 1/1999 |
| WO | 2006102214 A2 | 9/2006 |
| WO | 2008100052 A1 | 8/2008 |
| WO | 2016062513 A1 | 4/2016 |

\* cited by examiner

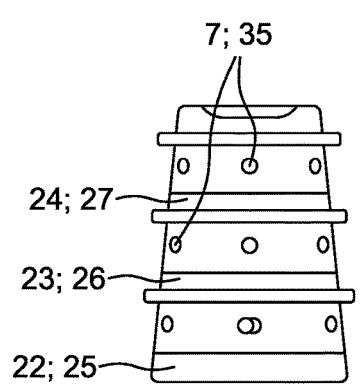
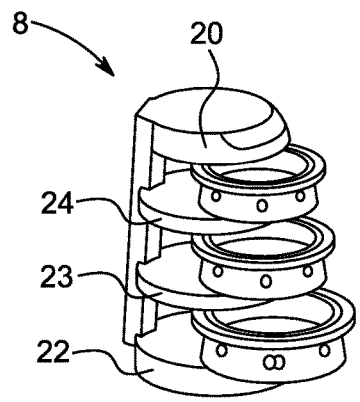
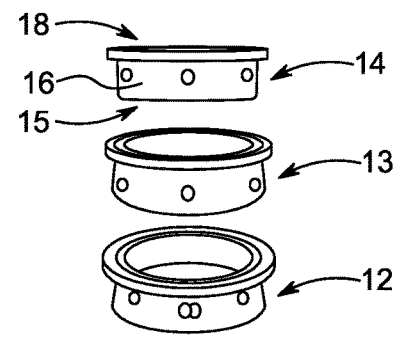
FIG. 7A     FIG. 7B     FIG. 7C
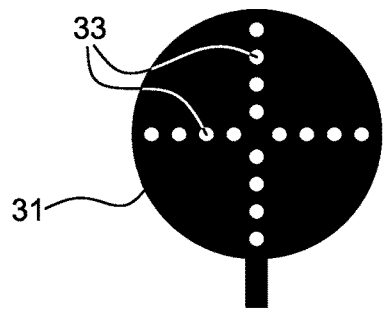
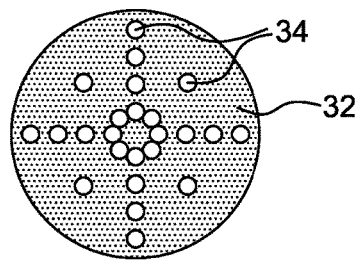
FIG. 8A
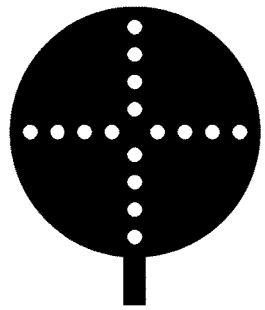
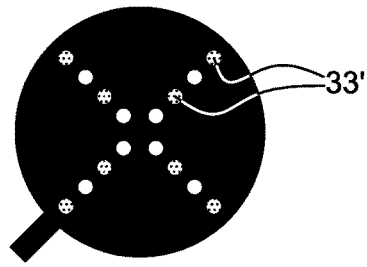
FIG. 8B     FIG. 8C

TABLE-TOP COOKING DEVICE

This application is the U.S. National Phase application under 35 U.S.C. § 371 of International Application No. PCT/EP2017/080004, filed on Nov. 22, 2017 and International Application No. 16200267.9, filed Nov. 23, 2016. These applications are hereby incorporated by reference herein.

FIELD OF THE INVENTION

The present invention relates to a table-top cooking device for preparing food.

BACKGROUND OF THE INVENTION

Increasingly, people wish to eat healthy, well balanced homemade meals. Such meals typically comprise a number of dishes, each requiring their own preparation method. For instance, vegetables may need to be steamed, meat may need to be roasted, potatoes may need to be fried. The desire to eat healthy may therefore conflict with another trend where people increasingly want to spend less time preparing their food. Known table-top cooking devices, such as steamers, rice cookers, multi cookers and fryers (air-based and low fat) respond to these conflicting needs in that they allow healthy dishes to be prepared with little input from a user, and often in less time than before. A problem with these known devices, however, is that they occupy a lot of space and require a considerable amount of coordination of the user to have all dishes ready at the right time.

SUMMARY OF THE INVENTION

It's an object of the present invention to avoid or at least attenuate one or more of the problems associated with the known cooking devices.

To that end, a table-top cooking device is provided, comprising a first food preparation chamber for receiving food to be prepared, and at least a second food preparation chamber for receiving food to be prepared. The first and second food preparation chamber are operable simultaneously to prepare food that in use is received therein. The first and second food preparation chamber are physically separated from each other in such way that each chamber may include an autonomous cooking environment, wherein the cooking method and/or at least one cooking parameter can differ per food preparation chamber.

Thus, the first food preparation chamber may be arranged to prepare food according to a first cooking method, which may for instance be selected from the following non-exhaustive list: steaming (all types, including low temperature steaming and superheated steaming), boiling, frying (low fat or air-based), baking, roasting, grilling or a combination of two or more of the aforementioned cooking methods. The second food preparation chamber may be arranged to prepare food according to a second cooking method from the aforementioned list, different from the first cooking method.

Alternatively or additionally, at least one cooking parameter in the first food preparation chamber can be set and controlled independently from that in the or each other food preparation chamber. The cooking parameter may for instance be selected from the following non-exhaustive list: temperature, cooking time, air flow rate, humidity, pressure.

In this context, table-top means that the device is sufficiently compact and/or portable to be stored in a cabinet or some other place, when not in use, and prior to use may be installed on a kitchen countertop or the like support surface.

Operable simultaneously means that the food preparation chambers may be operated at the same time. It does not mean that the food preparation chambers should be operated simultaneously all the time. As different dishes may have different preparation times, it may be desirable to start (or end) the preparation process in one of the food preparation chambers, before starting (or ending) the preparation process in the other chambers.

With such table-top cooking device, different dishes that require different cooking conditions can be prepared at the same time, thus allowing a complete, varied meal to be prepared in one go and with a single device.

The first food preparation chamber may for instance be arranged to steam, whereas the second food preparation chamber may for instance be arranged to fry, preferably low fat or air-based. Thus, vegetables may be prepared in the first food preparation chamber while fries may be prepared in the second food preparation chamber. A third food preparation chamber may be provided that may for instance be arranged to grill or roast. Thus, meat or fish may be prepared in the third food preparation chamber.

Alternatively, the food preparation chambers may be arranged to apply the same cooking method, but with at least one of the cooking parameters set differently. With such device, two or more food preparation chambers can be used to prepare the same food or dish, but with different properties such as doneness, crispiness or the like, to cater for different tastes. For instance, the first and second food preparation chamber may both be used to air fry fries, but one person may like his fries crispier than another. Both tastes can be served, by setting the airflow rate, temperature and/or preparation time differently per food preparation chamber.

A combination is possible, wherein both the cooking method and one or more cooking parameters can differ per food preparation chamber.

According to an aspect, the food preparation chambers may share one or more components, such as for instance a heat source, a moisture source and/or an air flow generating source. This may contribute to an efficient, compact device. Suitable control means may be provided to control the supply of aforementioned sources to the individual food preparation chambers. For example, containers that accommodate the respective food preparation chambers may be provided with permeable bottom and/or side walls, wherein the permeability is preferably adjustable.

According to an aspect, the food preparation chambers may be arranged one above the other. This may allow for a compact device. It may allow for some functionalities to be shared more easily. For instance, heat and/or steam may be shared readily, as both tend to flow upward. Aroma carrying air and/or vapour from food in one or more lower located food preparation chambers may travel upward and used in the preparation of food in one or more higher located food preparation chambers.

In further elaboration, the dimensions of the food preparation chambers may decrease towards the top of the stack, so as to get a pyramid shaped stack. Such architecture may mimic the food pyramid, wherein the uppermost and therefore smallest food preparation chamber may be dedicated for preparing meat, fish, vegetarian meat replacers and the like. The next lower, and slightly bigger food preparation chamber may be dedicated for preparing legumes, grains, carbohydrate rich food and the like. The lowermost and biggest food preparation chamber may be dedicated for preparing vegetables and fruits. Thus, the device may assist a user to eat healthier by portioning his food (more vegetables, less meat) as recommended by said food pyramid to get the correct daily dose of proteins, carbohydrates, fat, etc.

According to an aspect, there is provided a table-top kitchen device, comprising a first food preparation chamber and at least a second food preparation chamber. The first and second food preparation chamber are operable simultaneously to prepare food that in use is received therein, and the first and second food preparation chamber are physically separated from each other in such way that each chamber includes an autonomous cooking environment, wherein the cooking conditions, that is, a cooking method and/or at least one cooking parameter can differ per food preparation chamber.

In some embodiments, the device comprises at least three food preparation chambers, a first food preparation chamber being arranged for preparing vegetables, for instance by steaming or boiling, a second food preparation chamber being arranged for preparing fish, meat, meat replacers, for instance by grilling or roasting, and a third food preparation chamber being arranged for preparing a side dish, such as potatoes, rice or noodles.

In some embodiments, the first and second chamber are arranged to prepare food by air-based frying.

In some embodiments, at least one of the following cooking parameters can be set and controlled independently per food preparation chamber: the temperature, the air flow rate, the cooking time, the humidity, the pressure.

In some embodiments, each food preparation chamber is accommodated in a container, that is removably arranged in the device, so as to be movable between a mounted condition in which the food preparation chamber is enclosed, and a demounted condition, in which said food preparation chamber is easy accessible.

In some embodiments, the containers are stacked.

In some embodiments, the content of the food preparation chambers decrease towards a top of the stack.

In some embodiments, the containers are rotatable to set one or more cooking parameters.

In some embodiments, at least one of the containers comprises a permeable bottom and/or sidewall.

In some embodiments, the permeability is adjustable. In some embodiments, the permeability is adjustable through rotation of the container.

In some embodiments, the device comprises at least a heater, a fan and/or a steam supply source, wherein the food preparation chambers share at least one of the aforementioned components.

BRIEF DESCRIPTION OF THE DRAWINGS

Embodiments of the invention are described in more detail and by way of non-limiting examples with reference to the accompanying drawings, wherein:

FIGS. 2 to 7 schematically depict, in cross sectional view alternative embodiments of a table-top cooking device; and FIGS. 8A-C schematically depict, in top plan view, a partition with adjustable permeability.

DETAILED DESCRIPTION OF EMBODIMENTS

Figure 1:
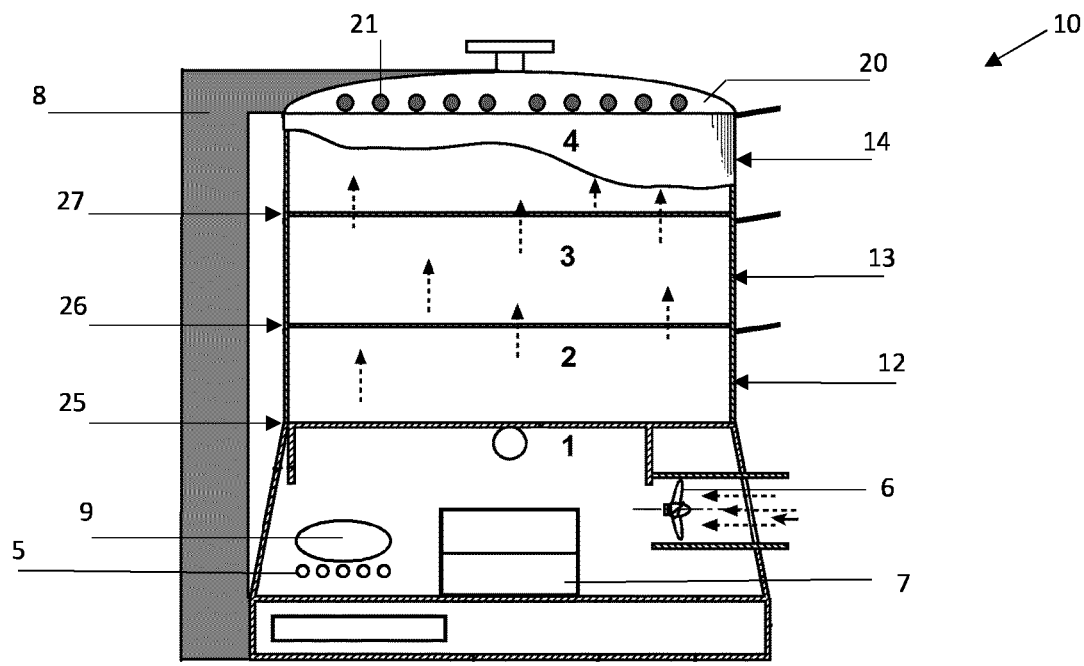
FIG. 1 schematically depicts, in cross sectional view, an embodiment of a table-top cooking device.

It should be understood that the Figures are merely schematic and are not drawn to scale. It should also be understood that the same reference numerals are used throughout the Figures to indicate the same or similar parts.

FIGS. 1-7 schematically depict various embodiments of a table-top cooking or kitchen device 10. All these devices have in common that they comprise at least two food preparation chambers 2, 3, wherein each of these chambers can be set with a cooking method and/or cooking parameter that differs from that in the other chamber. The devices may comprise additional food preparation chambers 4, as illustrated in FIGS. 1-5 and 7.

The table-top kitchen device 10 may further comprise a base 1. The base 1 may comprise components that are shared by at least some of the food preparation chambers 2, 3, 4. For instance, the base 1 may comprise a support structure 8 for mounting the food preparation chambers 2, 3, 4. Alternatively or additionally, the base 1 may comprise means for effecting the desired cooking conditions in the food preparation chambers. To that end, the base 1 may for instance include a heating element 5, a fan 6, a vent (not shown), a water reservoir, a user interface 7 and/or a processor (not shown). The fan 6 may be used to circulate air through one or more of the food preparation chambers. The heating element 5 may be used to heat said air. Alternatively or additionally, the heating element or a second heating element may be used to heat water from the water reservoir 9 so as to generate steam. The water or steam may be supplied to the food preparation chambers 2, 3, 4 to control the humidity therein. Alternatively, an external steam generator may be provided (not shown) to supply steam to the base 1 or to the food preparation chambers directly. The vent may be used to control the air flow, pressure and/or humidity in the base 1 and/or food preparation chambers 2, 3, 4. The user interface 7 may allow a user to enter desired cooking conditions (cooking method, cooking parameter) per food preparation chamber and may provide the user with feedback, for example on the actual cooking conditions in each food preparation chamber. The processor may be used to control the various components, to realize the desired cooking methods and/or cooking parameters. As the preparation time may differ per food preparation chamber, depending on the type of food and the selected cooking conditions, the processor may also help to control said different timings, so that all food can be ready at the same time.

Alternatively or additionally, at least some of the food preparation chambers 2, 3, 4 may be provided with their own heating element 21, fan 19, water reservoir, vent and/or user interface 7'. Some examples of this will be discussed below in relation to FIGS. 1 to 7.

Each food preparation chamber 2, 3, 4 may for instance be formed in or delimited by a container 12, 13, 14. In the illustrated embodiments, these containers 12, 13, 14 each have a basket-like configuration with a bottom 15, a surrounding sidewall 16 and an open top 18. Depending on the design of the support structure 8, the food preparation chambers 1, 2, 3 may be stacked, as illustrated in FIGS. 1-5 and 7, or arranged side by side as illustrated in FIG. 6. Of course, a combination is possible, wherein some food preparation chambers are arranged side by side and others are stacked. Stacking has the advantage that a bottom of an adjacent higher food preparation chamber may serve as lid, to close the open top of an adjacent lower food preparation chamber. Also, steam and/or heat may readily be transferred from a lower chamber to an adjacent higher chamber.

In the illustrated embodiments, the containers 12, 13, 14 can be mounted in the support structure 8 like drawers. The support structure 8 may be provided with platforms 22, 23, 24 (see FIGS. 7A-C). Each platform may support a container

12, 13, 14. At least some of the platforms may form a lid for an adjacent lower container, to close an open top 18 thereof. In an alternative embodiment, separate lids may be provided to close the containers. Alternatively, the food preparation chambers 12, 13, 14 may be predominantly delimited by the support structure 8 itself. To that end, the support structure 8 may be formed with housings or cavities (not shown), each housing or cavity being equipped with a closable door, lid or the like, to allow food or a food container to be placed therein. Alternative configuration are possible. Relevant is that the configurations are capable of physically separating the food preparation chambers from each other in such way that an autonomous cooking environment can be established in each chamber, with independently settable and controllable cooking conditions, i.e. cooking method and/or cooking parameter.

One or more food preparation chambers 2, 3, 4 may be in fluid connection with the base 1 and/or each other, for exchange of air, water and/or steam. Such fluid connection may for instance include a conduit 30 or a permeable wall or partition 25, 26, 27. At least part of these fluid connections may be comprised in the support structure 8. Thus, the support structure 8 may have several functions: mounting the food preparation chambers, closing or at least partly delimiting the food preparation chambers 2, 3, 4 and/or providing a fluid connection between said chambers and/or the base 1.

Referring now to each embodiment in more detail. FIG. 1 shows a table-top cooking or kitchen device 10 in which a first dish can be steamed and a second dish can be grilled simultaneously. To that end, the device comprises a base 1 as described above, a first food preparation chamber 2 stacked on top of said base 1, a second food preparation chamber 3 stacked on top of the first chamber 2, and a third food preparation chamber 4 stacked on top of the second chamber 3.

The third food preparation chamber 4 is closed with a lid 20. The third food preparation chamber comprises a heating element 21 for supplying radiation heat. The heating element 21 may be situated in an upper part of the food preparation chamber 4, for instance in the lid 20, as illustrated. Thus, the third chamber 4 may be used for grilling or roasting food.

The partition 25 between the base 1 and the first chamber 2 is permeable, to allow air and/or steam to flow through, as indicated by the arrows. Similar for the partitions 26, resp. 27 between the first and second food preparation chamber 2, 3, and the second and third food preparation chamber 3, 4. Thus, the food preparation chambers 2, 3, 4 may be used for steaming food.

The permeability of the or each partition 25, 26, 27 may be adjustable so as to allow independent adjustment of the air and/or steam rate to the respective food preparation chambers 2, 3, 4, and with that, independent adjustment of at least some of the cooking parameters in said chambers, for instance the cooking temperature, pressure and/or humidity.

To that end, the partition 25, 26, 27 may comprise two layers 31, 32 as shown in FIG. 8A, each layer 31, 32 including zones of different permeability. The first layer 31 may for instance be provided with apertures 33, arranged in a first pattern. The second layer 32 may be provided with apertures 34, arranged in a second pattern, as illustrated. The layers 31, 32 may be mounted on top of each other, one rotatable relative to the other. By rotating the layers relative to one another, the overlap in apertures 33, 34 can be adjusted as illustrated by FIGS. 8B and 8C. More particularly, FIG. 8B shows a first position in which the overlap in apertures 33, 34 is maximal, resulting in maximum permeability. FIG. 8C shows a second position in which less apertures 33, 34 overlap. That is, some of the apertures 33' in the upper layer 31 are blocked by a non-perforated portion of the lower layer 32. Thus, the permeability in said second position is less. The upper layer 31 may for instance form part of the bottom 15 of a container 12, 13, 14. The lower layer 32 may for instance form part of a platform 22, 23, 24 of the support structure 8.

Of course, other solutions are possible. For instance the aperture may be arranged in different patterns. The layers may be translated relative to each other instead of rotated. More than two layers may be provided, to increase the adjustability. Alternatively or additionally, air and/or steam may be supplied to the food preparation chambers 2, 3, 4 via a separate fluid connection, instead of via the permeable partitions 25, 26, 27, for instance via a conduit 30 (see FIGS. 4 and 5) that may be provided between the base 1 and said chambers 2, 3, 4 and/or between adjacent chambers. As mentioned before, such fluid connection(s) may be accommodated in the support structure 8. The fluid connection may be provided with a valve or the like control organ to control the air and/or steam supply to the respective chambers 2, 3, 4.

In some further or alternative embodiments, the two layers may be rotatable relative to one another to set a cooking method and/or at least one cooking parameter other than cooking temperature, pressure and/or humidity mentioned above.

Figure 2:
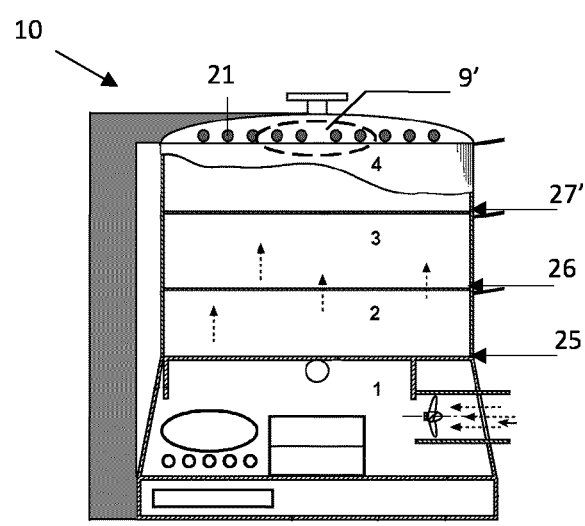

FIG. 2 shows a variation on the embodiment of FIG. 1 wherein the partition 27' between the second and third food preparation chamber 3, 4 is non-permeable, so closed to air and/or steam from the adjacent lower chamber 3. A separate water reservoir 9' may be provided in the third food preparation chamber 4, to allow humidity control in said chamber.

Figure 3:
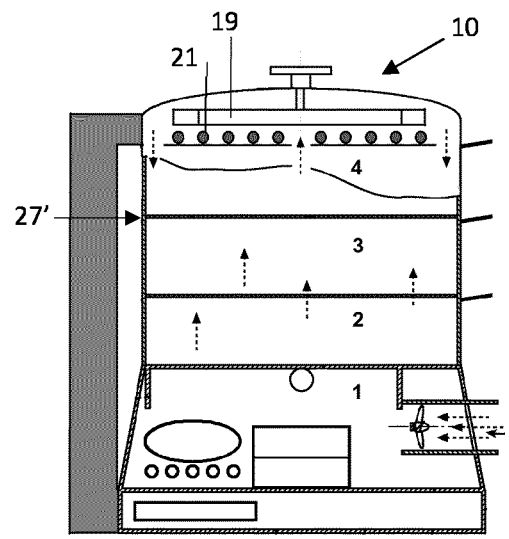

FIG. 3 shows a variation on the embodiment of FIG. 2, wherein the upper food preparation chamber 4 is provided with a fan 19 in addition to the heating element 21. The fan 19 serves to forcefully circulate hot air (heated by the heating means 21) through the food, either in upward or downward direction, so as to fry the food by air. Suitable guiding means may be provided to return the air along an inner periphery of the chamber 4.

With such device, food such as vegetables or rice can be steamed in the first and second food preparation chamber 2, 3 while food such as potatoes or chicken wings can be fried simultaneously in the third food preparation chamber 4. By varying the permeability of the partition 26 between the first and second food preparation chamber 2, 3 the cooking parameters in these chambers can be varied independently, such as for instance the humidity, the temperature and/or the pressure. Thus, different food types which may require different steaming settings may be steamed simultaneously.

Figure 4:
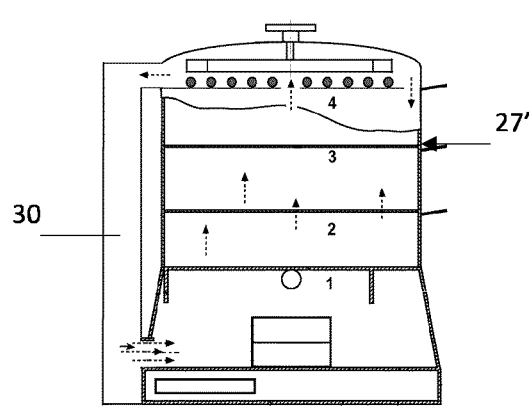

FIG. 4 shows a variation on the embodiment of FIG. 3, wherein a fluid connection 30 is provided between the third food preparation chamber 4 and the base 1. Thanks to this fluid connection 30, part of the hot air that in use is circulated in the third food preparation 4 can be guided to the base 1 where it may subsequently be used for instance to heat the other chambers 2, 3.

Figure 5:
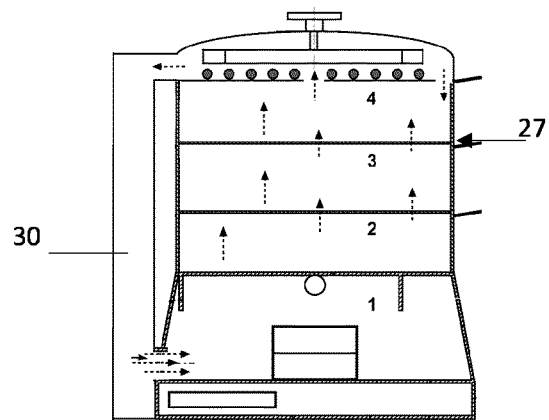
Figure 6:
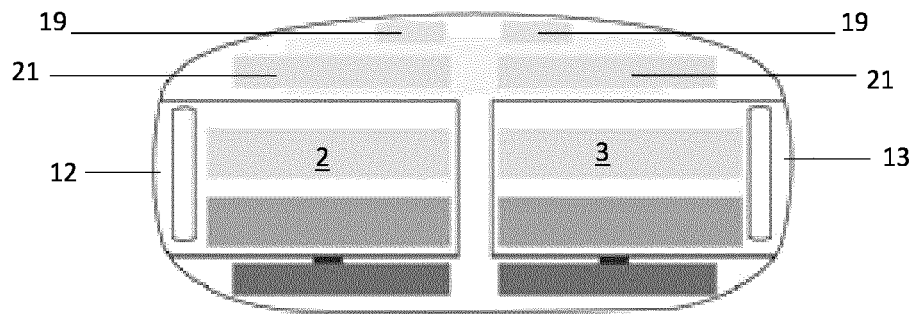

FIG. 5 shows a variation on the embodiments of FIGS. 3 and 4, wherein the third food preparation chamber 4 comprises the heating element 21 and the fan 19 and wherein additionally the partition 27 between the second and third food preparation chamber 3, 4 is permeable, like the one in the embodiments of FIGS. 1 and 2, thus allowing steam from the lower food preparation chamber 3 to be supplied into the upper food preparation chamber 4.

FIG. 6 shows an embodiment of a table top kitchen device with two food preparation chambers 2, 3, both chambers being arranged for air frying food that in use may be disposed therein. The chambers are arranged side by side and are physically separated such that the cooking parameters in the food preparation chambers 2, 3 can be set independently. Each chamber 2, 3 may comprise a heating element 21 and a fan 19, for forcefully circulating hot air through the food. The fan 19 and heating element 21 may for instance be situated above or in an upper part of each chamber 2, 3. Alternatively, the chambers 2, 3 may each include their own heating element 21 and share a single fan 19. In such case, suitable control means may be provided to control the air flow rate of said fan to the respective chambers 2, 3.

Each food preparation chamber 2, 3 may include suitable air guide elements to guide the air circulation according to a predetermined pattern, wherein preferably the air flow is evenly distributed through the food so that heat from the air flow is evenly transferred to said food. The air may be returned via a periphery of the chamber 2, 3.

Similar to the other embodiments, each food preparation chambers 2, 3 may be accommodated in a container 12, 13 which may for instance be removably mounted in a support structure 8 of the device, for instance like a drawer.

FIGS. 7A-C show a stack of three food preparation chambers 2, 3, 4 with the size of the food preparation chambers decreasing toward the top of the stack. The base 1 (not shown) may be similar to the ones shown before. Alternatively, at least some of the base components may be housed in the top lid 20 and/or in the respective food preparation chambers 2, 3, 4. The device may for instance have a similar arrangement as shown in FIGS. 4 and 5, wherein a heating element 21 and a fan 19 may be housed in the top lid 20. Part of the hot air generated by these components may be circulated through the entire device via suitable conduits 30 which may be included in the support structure 8 with its platforms 22, 23, 24. These platforms may further form part of partitions 25, 26, 27 between the food preparation chambers 2, 3, 4, wherein the permeability of these partitions 25, 26, 27 may be adjustable, similar as described before with reference to FIGS. 8A-C.

The pyramid-shape of the stack may be used to mimic the food pyramid. More particularly, the smallest food preparation chamber 4 at the top may be arranged for preparing fish, meat or meat replacers. To that end, this chamber 4 may for instance comprise a heating element and/or a fan, so as to allow the food to be fried or grilled. The food preparation chamber 3 in the middle may be arranged for preparing grains, legumes and starchy vegetables. To that end, this chamber 3 may for instance comprise a steam supply source. The largest food preparation chamber 2 at the bottom may be arranged for preparing fruits and vegetables. The pyramid shape helps in that it may intuitively guide a user to place the different food types in the right food preparation chamber where the food will be exposed to the correct cooking method. Of course, this intuitive guidance may be assisted by symbols, icons or other suitable information that may be presented on the food preparation chambers, as will be described below. The pyramid configuration may also help to portion the various food types correctly, or more particularly, as recommended by the food pyramid, with more vegetables than meat.

As illustrated, the containers 12, 13, 14 may be provided with a series of symbols, icons or the like, representative for the different food types and/or dishes that can be prepared in the respective food preparation chamber. These icons may guide the user into placing the various foods in the correct chamber. Alternatively or additionally, they may be part of a user interface 7' for setting one or more cooking parameters. After having placed the food in the chamber, the user merely has to rotate the chamber such that the icon that matches his food or dish faces in a predetermined direction, e.g. to the front. This then may automatically set the correct permeability of the partition 25, 26, 27. Alternatively or additionally, it may automatically set other cooking parameters, such as temperature and time, which may be pre-stored in the device for each food type and/or dish. Based on this settings, the processor may than calculate which chamber needs to be operated when to have all dishes ready at the same time. Thus, a device is obtained with which several dishes can be prepared at the same time, automatically, with the correct cooking method and/or taking into account individual tastes, without further user input and/or coordination being needed to have the dishes ready at the same time. Alternatively or additionally, rotating the chamber (or a container that accommodates the chamber) may set a cooking method. For example, rotation of the chamber may change the cooking method from steam cooking to air-based frying. This is merely exemplary however, and rotation of the chamber may change the cooking method from and/or to any of the other cooking methods described herein.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A table-top kitchen device, comprising a first food preparation chamber and a second food preparation chamber,
    wherein the first and second food preparation chambers are operable simultaneously to prepare food received therein,
    wherein the first and second food preparation chambers are physically separated from each other in such way that each chamber includes an autonomous cooking environment with independently settable and controllable cooking conditions, wherein the cooking conditions comprise at least one of a cooking method and at least one cooking parameter,
    wherein the table-top kitchen device further comprises a base comprising a support structure for mounting the first food preparation chamber and the second food preparation chamber, and
    wherein the first and second food preparation chambers each is accommodated in a separate container, wherein each separate container comprises a permeable bottom, wherein each separate container is rotatable to adjust the permeable bottom, wherein a partition positioned between the permeable bottom of the separate container of the first food preparation chamber and the permeable bottom of the separate container of the second food preparation chamber, wherein the partition comprises permeable two layers that are rotatable relative to one another, wherein the first and second food preparation chambers are in fluid connection with each other and with the base through the permeable bottom of the separate container of the first food preparation chamber, the permeable bottom of the separate container of the second food preparation chamber and the permeable two layers of the partition such that the cooking conditions are independently controlled by a rotation of at least one of the permeable bottom of the separate container of the first and second food preparation chambers and the permeable two layers of the partition.

2. The table-top kitchen device of claim 1, further comprising a third food preparation chamber, wherein the first food preparation chamber arranged for preparing vegetables by steaming or boiling, wherein the second food preparation chamber being arranged for preparing fish, meat, meat replacers, by grilling or roasting, and wherein the third food preparation chamber being arranged for preparing a side dish, potatoes, rice or noodles.

3. The table-top kitchen device of claim 1, wherein the first food preparation chamber and the second food preparation chambers are arranged to apply the same cooking method, and wherein at least one cooking parameter of the first preparation chamber is set differently from at least one cooking parameter of the second preparation chamber.

4. The table-top kitchen device of claim 1, wherein the first and second food preparation chambers are arranged to prepare food by air-based frying.

5. The table-top kitchen device of claim 1, wherein the first food preparation chamber is configured to prepare food according to a first cooking method and the second food preparation chamber is configured to prepare food according to a second cooking method that is different to the first cooking method.

6. The table-top kitchen device of claim 5, wherein the first cooking method comprises air-based frying.

7. The table-top kitchen device of claim 1, wherein at least one of the following cooking parameters can be set and controlled independently per food preparation chamber: a temperature, a air flow rate, a cooking time, a humidity, and a pressure.

8. The table-top kitchen device of claim 1, wherein each of the separate container is removably arranged in the table-top kitchen device, so as to be movable between a mounted condition in which the corresponding food preparation chamber is enclosed, and a demounted condition, in which said corresponding food preparation chamber is easy accessible.

9. The table-top kitchen device of claim 8, wherein each of the separate container corresponding to the first and second food preparation chambers are stacked.

10. The table-top kitchen device of claim 9, wherein a size of food preparation chambers decreases towards a top of the stack.

11. The table-top kitchen device of claim 8, wherein each of the separate container corresponding to the first and second food preparation chambers are rotatable to set at least one of the cooking method and the at least one cooking parameter.

12. The table-top kitchen device of claim 8, wherein each of the separate container corresponding to food preparation chambers comprises a permeable sidewall.

13. The table-top kitchen device of claim 12, wherein a permeability of the permeable sidewall is adjustable.

14. The table-top kitchen device of claim 13, wherein the permeability of the sidewall is adjustable through rotation of the containers.

15. The table-top kitchen device of claim 1, further comprising components including at least one of a heater, a fan, and a steam supply source, wherein food preparation chambers share at least one of the components.

16. The table-top kitchen device of claim 1, wherein a portion of a fluid corresponding to the fluid connection is contained in the support structure for providing the fluid connection between food preparation chambers or between at least one of the food preparation chambers and the base.

17. The table-top kitchen device of claim 2, wherein a part of hot air used in the third food preparation chamber is guided to the base for subsequent reuse to heat the first and second food preparation chambers.

* * * * *